J. A. GREENE.
Rubber-Tire for Vehicle-Wheels.
No. 169,100.  Patented Oct. 26, 1875.
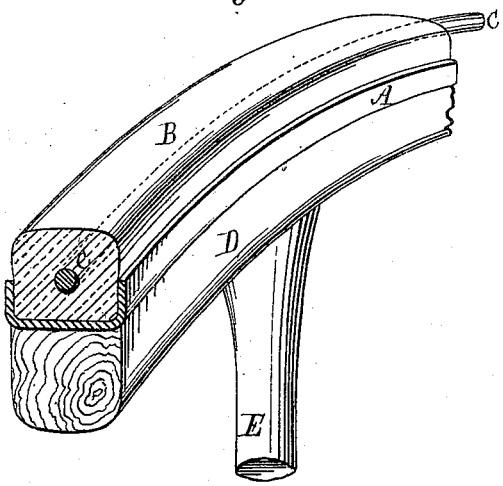
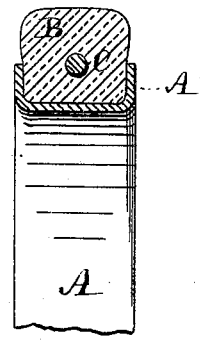
Witnesses:
Ewell a. Dick
W. E. Chaffee
Inventor:
J. Ashton Greene
by Pollok & Bailey
his attorneys.

UNITED STATES PATENT OFFICE.

JOHN ASHTON GREENE, OF BROOKLYN, NEW YORK.

IMPROVEMENT IN RUBBER TIRES FOR VEHICLE-WHEELS.

Specification forming part of Letters Patent No. 169,100, dated October 26, 1875; application filed October 9, 1875.

*To all whom it may concern:*

Be it known that I, JOHN ASHTON GREENE, of Brooklyn, in the county of Kings and State of New York, have invented certain new and useful Improvements in Rubber Tires for Wheels, of which the following is a specification:

This invention relates to rubber tires for vehicles, and is an improvement on the mode of constructing and attaching rubber tires to wheels for which Letters Patent of the United States were granted to me on the 15th day of June, 1869, and which are numbered 91,435.

Experimental use of tires referred to has proven that they were liable to many objections, and it is the object of the present invention to remedy the same.

In order that the improvements which I have adapted may be more readily understood and appreciated, I shall first point out the objections which attended the use of the rubber tires made in accordance with my said patent.

The rubber tire, when firmly stretched upon the wheel and lodged in the concave receptacle formed for that purpose upon the felly or the metallic tire which encircled it, would, on being subjected to use on pavements, and exposed to constant compression on successive portions of its periphery, become unduly stretched until it would eventually become loose and detach itself from the wheel.

This liability of getting off the wheel rendered the use of such rubber tires unsafe, and had, for that reason, to be abandoned until some means could be discovered which would maintain the tire in its place.

Numerous and costly experiments have resulted in my overcoming the difficulty named, and this I have accomplished by so constructing the rubber tire, or so combining it with a comparatively unyielding substance, that, while maintaining its valuable features of elasticity in a transverse direction, or radially to the wheel, it will, nevertheless, be unstretchable or unyielding in the direction of the periphery, thus combining the advantages of a rubber tire with those of a metallic tire. This I have carried into practice in various ways. Thus I have combined with, or placed into the body of, the rubber tire an endless band of wire, variously shaped—flat, round, or twisted. I have also combined with it chains or multiple-stranded cables of wires, or other means substantially the same, or the equivalent of these.

The rubber tire thus constructed is made in a mold, and vulcanized with the metallic anti-stretcher embodied in the plastic rubber compound.

Any competent manufacturer of rubber will know how to make the tire from the above description given.

The rubber tire may also be made with a metallic flanged receptacle, which may then be applied to an ordinary tired wheel, or direct to the wooden felly.

In the drawing I have shown, in Figure 1, a perspective view of a section of the wheel with my improved rubber tire applied to it. Fig. 2 is a sectional view of the tire with its metallic flanged receptacle detached from the felly.

In the drawing, B is the rubber tire; C, a stout wire, occupying the center of the rubber; and A, the flanged receptacle before mentioned; and D and E are, respectively, the felly and spoke of a wheel onto which it is applied.

Having thus described my invention, what I claim, and desire to secure by Letters Patent, is as follows:

1. The combination, with a rubber tire, of a metallic core, substantially as shown and described.

2. The combination, with a rubber tire and its metallic core, of a flanged tire, substantially as shown and described.

In testimony whereof I have hereunto signed my name this 25th day of September, A. D. 1875.

J. ASHTON GREENE.

Witnesses:
 J. N. WYCKOFF,
 G. W. DAKIN.